US008238707B2

(12) United States Patent
Smrha et al.

(10) Patent No.: US 8,238,707 B2
(45) Date of Patent: Aug. 7, 2012

(54) LOCKING SPOOL FOR TELECOMMUNICATIONS CABLE AND METHOD

(75) Inventors: Mark Smrha, Burnsville, MN (US); Chad James Sjodin, Savage, MN (US); Thomas C. Tinucci, Chaska, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 409 days.

(21) Appl. No.: 12/512,620

(22) Filed: Jul. 30, 2009

(65) Prior Publication Data

US 2011/0024544 A1    Feb. 3, 2011

(51) Int. Cl.
*G02B 6/00* (2006.01)
*G02B 6/46* (2006.01)

(52) U.S. Cl. .................. 385/135; 385/136; 385/137

(58) Field of Classification Search .............. None
See application file for complete search history.

(56) References Cited

U.S. PATENT DOCUMENTS

| 1,137,133 | A | 4/1915 | Hamelback |
|---|---|---|---|
| 1,276,825 | A | 8/1918 | Swope |
| 2,206,352 | A | 7/1940 | Hellmann |
| 2,605,060 | A | 7/1952 | Bell |
| 2,874,918 | A | 2/1959 | Steiber |
| 2,905,409 | A | 9/1959 | Sheldon |
| 3,120,355 | A | 2/1964 | Bowman |
| 3,632,061 | A | 1/1972 | Roseboom |
| 3,822,834 | A | 7/1974 | Fjarlie |
| 3,831,879 | A | 8/1974 | Miller et al. |
| 4,008,791 | A | 2/1977 | Shafii-Kahany et al. |
| 4,055,314 | A | 10/1977 | Kovaleski |
| 4,111,380 | A | 9/1978 | Heuckroth |

(Continued)

FOREIGN PATENT DOCUMENTS

JP    2-296201    12/1990

(Continued)

OTHER PUBLICATIONS

Decoiler Devices/Traverse Arms/Accessories, http://replay.web.archive.org/20060518044402/https://weldingsupply.securesites.com/, 4 pages (May 18, 2006).

(Continued)

*Primary Examiner* — Michelle R Connelly
(74) *Attorney, Agent, or Firm* — Merchant & Gould P.C.

(57) ABSTRACT

The present disclosure relates to a spool for a telecommunications cable. The spool prevents twisting of the cable when the spool is operated by requiring that any connections to a side of the spool are disconnected before rotation of the spool can begin. The spool includes a base, a hub, a connector bulkhead, a barrier member, and a hub locking member. A first flange of the hub is rotatably mounted to the base. The connector bulkhead receives a terminated end of the cable and is attached to a second flange of the hub. The barrier member is moveably attached to the second flange of the hub. The barrier member has a first position that obstructs access to the terminated end of the cable and a second position that allows access to the end of the cable. The hub locking member is operably connected to the barrier member such that the hub and the base are not locked by the hub locking member when the barrier member is at the first position, and the hub and the base are locked together by the hub locking member when the barrier member is at the second position.

20 Claims, 6 Drawing Sheets

U.S. PATENT DOCUMENTS

| | | | | |
|---|---|---|---|---|
| 4,186,897 | A | 2/1980 | Brown | |
| 4,222,535 | A | 9/1980 | Hosbein | |
| 4,282,954 | A | 8/1981 | Hill | |
| 4,565,333 | A | 1/1986 | Meneian | |
| 4,978,191 | A | 12/1990 | Hasegawa et al. | |
| 5,022,600 | A * | 6/1991 | Blanc et al. | 242/378.2 |
| 5,058,259 | A | 10/1991 | Araki et al. | |
| 5,069,523 | A | 12/1991 | Finzel et al. | |
| 5,078,466 | A * | 1/1992 | MacCulloch | 385/26 |
| 5,098,028 | A | 3/1992 | Ida et al. | |
| 5,165,543 | A * | 11/1992 | Heyda et al. | 206/400 |
| 5,268,986 | A | 12/1993 | Kakii et al. | |
| 5,277,314 | A | 1/1994 | Cooper et al. | |
| 5,332,171 | A | 7/1994 | Steff | |
| 5,335,874 | A * | 8/1994 | Shrum et al. | 242/118.4 |
| 5,450,509 | A | 9/1995 | Davis | |
| 5,481,607 | A | 1/1996 | Hsiao | |
| 5,494,446 | A | 2/1996 | DeLucia et al. | |
| 5,544,836 | A | 8/1996 | Pera | |
| 5,607,316 | A * | 3/1997 | Ishikawa | 439/164 |
| 5,669,571 | A | 9/1997 | Graybill | |
| 5,679,015 | A | 10/1997 | Schauer | |
| 5,758,834 | A | 6/1998 | Dragoo et al. | |
| 5,797,558 | A | 8/1998 | Peterson et al. | |
| 5,913,487 | A | 6/1999 | Leatherman | |
| 5,915,062 | A * | 6/1999 | Jackson et al. | 385/137 |
| 5,921,497 | A | 7/1999 | Utley, Jr. | |
| 5,993,229 | A | 11/1999 | Tanaka et al. | |
| 5,996,930 | A | 12/1999 | Katayama et al. | |
| 6,077,108 | A | 6/2000 | Lorscheider et al. | |
| 6,215,938 | B1 | 4/2001 | Reitmeier et al. | |
| 6,220,413 | B1 | 4/2001 | Walters et al. | |
| 6,250,578 | B1 | 6/2001 | Manda | |
| 6,260,781 | B1 | 7/2001 | Cooper | |
| 6,305,958 | B1 * | 10/2001 | Maegawa et al. | 439/164 |
| 6,325,665 | B1 | 12/2001 | Chung | |
| 6,328,243 | B1 | 12/2001 | Yamamoto | |
| 6,349,893 | B1 | 2/2002 | Daoud | |
| 6,361,237 | B1 | 3/2002 | Salmela | |
| 6,375,109 | B1 | 4/2002 | Liao | |
| 6,405,961 | B1 | 6/2002 | Mastrangelo | |
| 6,433,274 | B1 | 8/2002 | Doss et al. | |
| 6,484,958 | B1 | 11/2002 | Xue et al. | |
| 6,522,826 | B2 * | 2/2003 | Gregory | 385/135 |
| 6,572,393 | B2 | 6/2003 | Kawamura | |
| RE38,211 | E | 8/2003 | Peterson et al. | |
| 6,616,080 | B1 | 9/2003 | Edwards et al. | |
| 6,643,443 | B2 | 11/2003 | Holman et al. | |
| 6,643,445 | B2 * | 11/2003 | Bumgarner et al. | 385/137 |
| 6,744,954 | B1 * | 6/2004 | Tanaka et al. | 385/113 |
| 6,795,633 | B2 * | 9/2004 | Joseph, II | 385/135 |
| 6,819,848 | B2 * | 11/2004 | Takahashi | 385/123 |
| 6,856,748 | B1 | 2/2005 | Elkins, II et al. | |
| 6,915,058 | B2 | 7/2005 | Pons | |
| 7,017,846 | B2 | 3/2006 | Tsoi et al. | |
| 7,036,761 | B2 | 5/2006 | Washington et al. | |
| 7,086,512 | B2 | 8/2006 | Shack et al. | |
| 7,104,491 | B2 | 9/2006 | Vinding | |
| 7,116,883 | B2 | 10/2006 | Kline et al. | |
| 7,120,349 | B2 | 10/2006 | Elliott | |
| 7,182,286 | B2 | 2/2007 | Huang | |
| 7,266,283 | B2 | 9/2007 | Kline et al. | |
| 7,315,681 | B2 | 1/2008 | Kewitsch | |
| 7,357,666 | B2 | 4/2008 | Wu | |
| 7,369,739 | B2 | 5/2008 | Kline et al. | |
| 7,460,753 | B2 | 12/2008 | Kewitsch | |
| 7,548,679 | B2 | 6/2009 | Hirano et al. | |
| 7,599,598 | B2 | 10/2009 | Gniadek et al. | |
| 7,627,218 | B2 | 12/2009 | Hurley | |
| 7,680,386 | B2 | 3/2010 | Hurley | |
| 2002/0122643 | A1 * | 9/2002 | Bueschelberger et al. | 385/123 |
| 2003/0059192 | A1 * | 3/2003 | Johnson | 385/135 |
| 2003/0095773 | A1 | 5/2003 | Ichinari et al. | |
| 2004/0211851 | A1 | 10/2004 | Barton et al. | |
| 2006/0045458 | A1 * | 3/2006 | Sasaki et al. | 385/135 |
| 2006/0264921 | A1 | 11/2006 | Deutsch et al. | |
| 2007/0196053 | A1 | 8/2007 | Kewitsch | |
| 2008/0019642 | A1 | 1/2008 | Kewitsch | |
| 2008/0273844 | A1 | 11/2008 | Kewitsch | |
| 2008/0292261 | A1 | 11/2008 | Kowalczyk et al. | |
| 2009/0060441 | A1 | 3/2009 | Kowalczyk et al. | |
| 2009/0074370 | A1 | 3/2009 | Kowalczyk et al. | |
| 2009/0097797 | A1 | 4/2009 | Kewitsch | |
| 2010/0329621 | A1 | 12/2010 | Makrides-Saravanos et al. | |
| 2011/0024543 | A1 * | 2/2011 | Smrha | 242/377 |

FOREIGN PATENT DOCUMENTS

| | | |
|---|---|---|
| JP | 5-303018 | 11/1993 |
| JP | 2000-284129 | 10/2000 |
| JP | 2003-29059 | 1/2003 |
| JP | 2003-329850 | 11/2003 |
| JP | 2003-329851 | 11/2003 |
| WO | WO 2006/015343 A2 | 2/2006 |
| WO | WO 2006/078007 A1 | 7/2006 |

OTHER PUBLICATIONS

Decoiler Devices/Traverse Arms/Accessories, https://weldingsupply.securesites.com/yeoweld-fax.html, 5 pages (Date Printed May 2, 2011).

U.S. Appl. No. 13/025,779, filed Feb. 11, 2011 entitled "Spool for Telecommunications cable and method".

Telescent Catalog Fiber Optic Connectivity, pp. 1-39 (Copyright 2007).

Catalogue-Fastening Solutions—Richco—(Version JPG)—p. 227, 3 pages (Date Unknown).

Fiber Management, Richco, p. 211 (Date Unknown).

Fiberlaunch, 4 pages (Copyright 2010).

Fibre Fastening and Routing Components, Richco, pp. 54-72 (Date Unknown).

Fibre Winding Reel, Europlus Technologies plc, 2 pages (Date Unknown).

* cited by examiner

LOCKING SPOOL FOR TELECOMMUNICATIONS CABLE AND METHOD

BACKGROUND

Spools or reels can be used to store telecommunications cable (e.g., electrical cable and/or fiber optic cable). The spools include a hub or a drum about which the cable is wound. The hub of the spools is often cylindrical, and the cable is often wrapped around the cylindrical hub in a predominantly circumferential manner. By winding up the cable on the spool, the cable can be compactly stored and transported, protected from tangling and kinking, and kept ready for easy deployment.

SUMMARY

Features of the present disclosure relate to a spool for a telecommunications cable. The spool includes a base, a hub, a connector bulkhead, a barrier member, and a hub locking member. The base includes a spool mount. The hub includes a cable wrapping area that extends between a first flange and an opposite second flange. The first flange of the hub is rotatably mounted to the spool mount of the base. The connector bulkhead is adapted to receive a terminated end of the telecommunications cable and is attached to the second flange of the hub. The barrier member is moveably attached to the second flange of the hub. The barrier member has a first position that obstructs access to the terminated end of the telecommunications cable and a second position that allows access to the terminated end of the telecommunications cable. The hub locking member is operably connected to the barrier member such that the hub and the base are not locked by the hub locking member when the barrier member is at the first position, and the hub and the base are locked together by the hub locking member when the barrier member is at the second position.

The spool of the present disclosure prevents twisting of the telecommunications cable when the spool is operated by effectively requiring that any connections to a side of the spool are disconnected before rotation of the spool can begin.

These and other features and advantages will be apparent from a reading of the following detailed description and a review of the associated drawings. It is to be understood that both the forgoing general description and the following detailed description are explanatory only and are not restrictive of the broad aspects of the disclosure.

DETAILED DESCRIPTION

It is often desirable to deploy a telecommunications cable with a length of the telecommunications cable varying for various purposes. For example, it may be desired to connect the telecommunications cable to various ports that vary in location and/or distance from each other. It is often desirable to retract a telecommunications cable when the telecommunications cable is not connected and thereby keep the telecommunications cable from cluttering a data center and/or a work area, etc.

FIGS. 1-7 illustrate a spool 10 for a telecommunications cable 12 in accordance with the principles of the present disclosure. The spool 10 includes a base 14, a hub 18, a connector bulkhead 20, a barrier member 16, and a hub locking member 22. As depicted, the base 14 is adapted for stationary mounting. The base 14 can be mounted on a frame, a rail, a cabinet, and/or on other telecommunications infrastructure.

The base 14 includes a spool mount 24. As depicted, the spool mount 24 includes a bearing 26. The hub 18 includes a cable wrapping area 28. The cable wrapping area 28 extends between a first flange 30 and an opposite second flange 32. The first flange 30 of the hub 18 is rotatably mounted to the spool mount 24 of the base 14. The connector bulkhead 20 is adapted to receive a terminated end 36 of the telecommunications cable 12. The connector bulkhead 20 is removably attached to the second flange 32 of the hub 18 by a fastener 76. The connector bulkhead 20 can include a plate-like member 34. The bearing 26 defines an axis A1 (see FIG. 1) about which the hub 18 rotates. The first and the second flanges 30, 32 are depicted as being substantially planar and of a plate like configuration that is generally perpendicular to the axis A1.

The barrier member 16 is moveably attached to the second flange 32 of the hub 18. The barrier member 16 can be moveably attached to the connector bulkhead 20 that, in turn, is connected to the second flange 32 of the hub 18. As depicted, the barrier member 16 is hingedly attached to the connector bulkhead 20 that is connected to the second flange 32 of the hub 18. A hinge 78 is shown connecting the barrier member 16 to the connector bulkhead 20. The barrier member 16 has a first position (see FIGS. 1 and 5) that obstructs access to the terminated end 36 of the telecommunications cable 12 and a second position (see FIGS. 2 and 7) that allows access to the terminated end 36. As depicted, the barrier member has a plate like configuration. As depicted, the terminated end 36 includes a fiber optic connector 38 that is connected to a fiber optic adapter 40. The opposite end of the telecommunications cable 12 can include a second fiber optic connector 74. The first position of the barrier member 16 obstructs access to the fiber optic adapter 40, and the second position of the barrier 16 allows access to the fiber optic adapter 40. The connector bulkhead 20 includes provisions to receive and hold one or more of the fiber optic adapters 40. The fiber optic adapter 40 can be covered with a cap 42.

Figure 1:
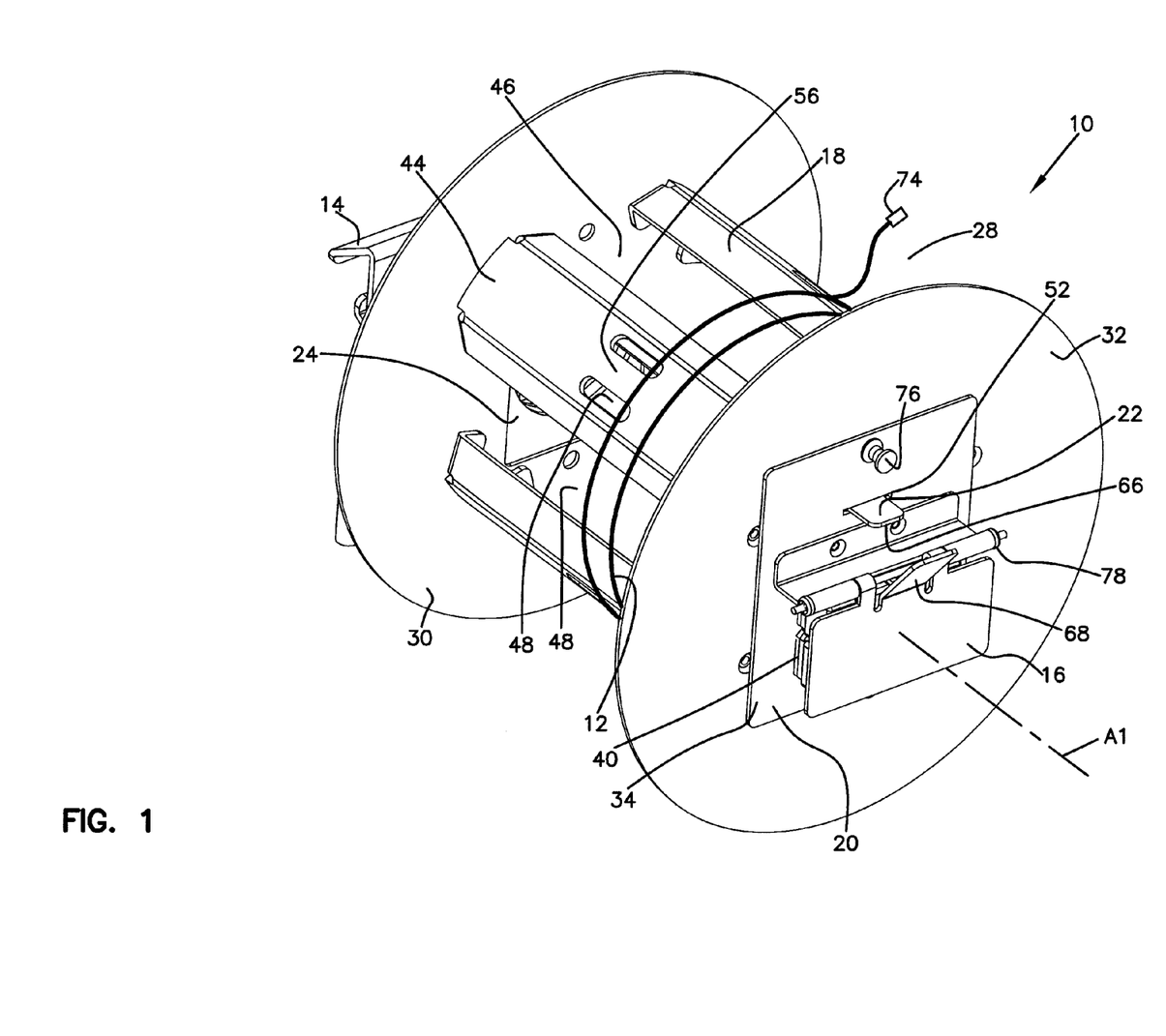
FIG. 1 is a perspective view of a spool for a telecommunications cable in accordance with the principles of the present disclosure, the spool shown in an unlocked configuration.
Figure 2:
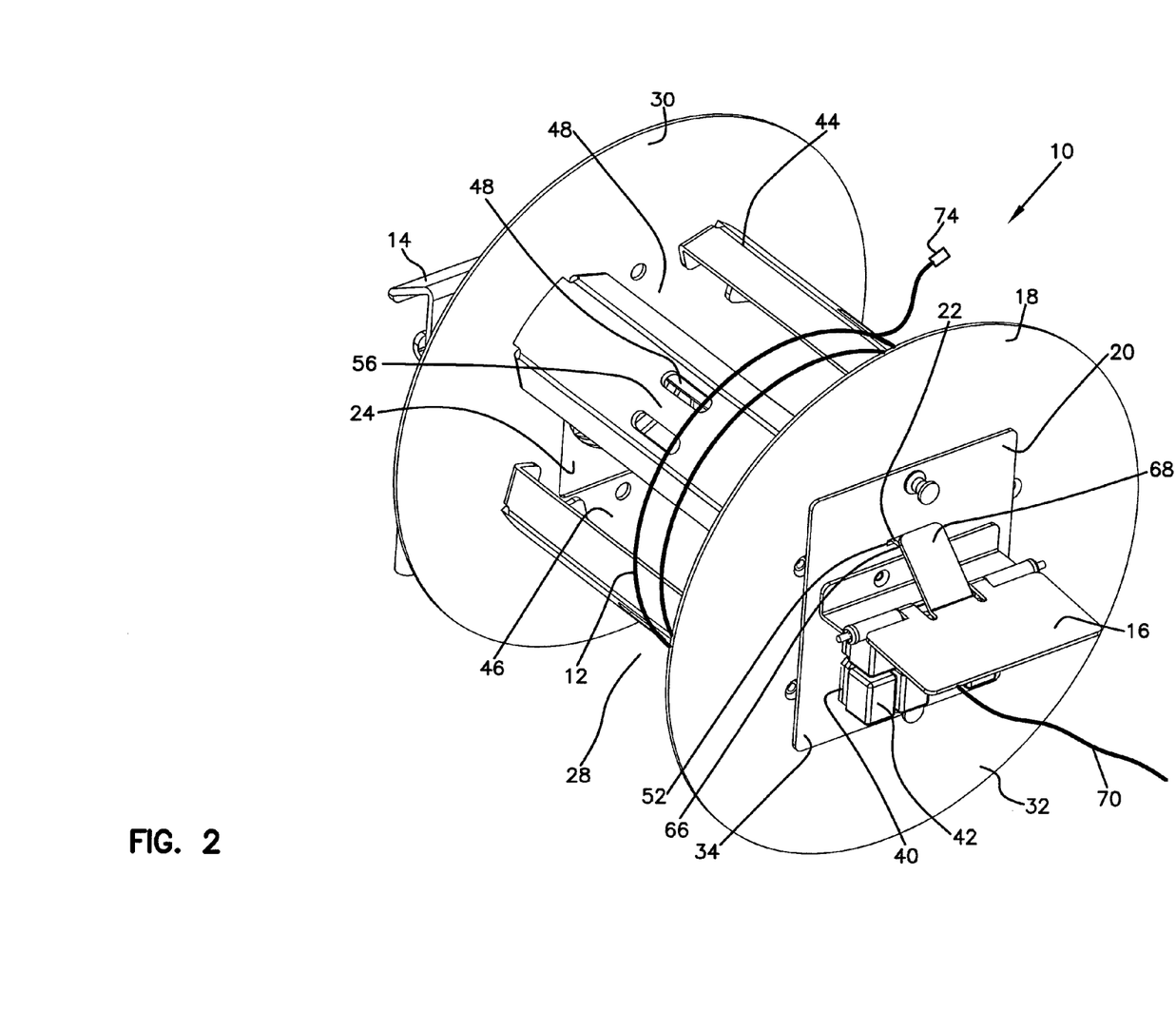
FIG. 2 is the perspective view of FIG. 1 but with the spool shown in a locked configuration.
Figure 3:
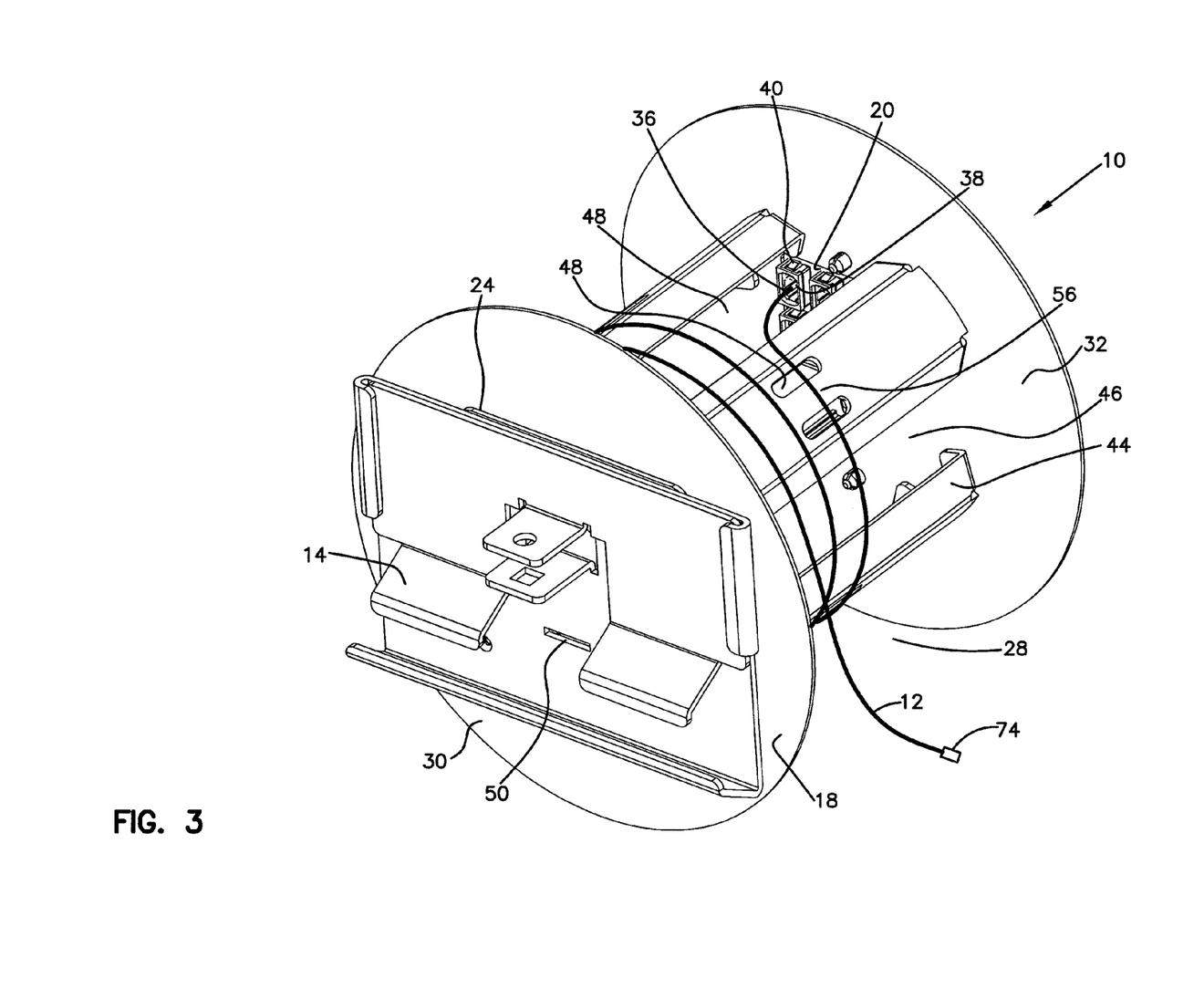
FIG. 3 is another perspective view of the spool of FIG. 1 shown in the unlocked configuration of FIG. 1.
Figure 4:
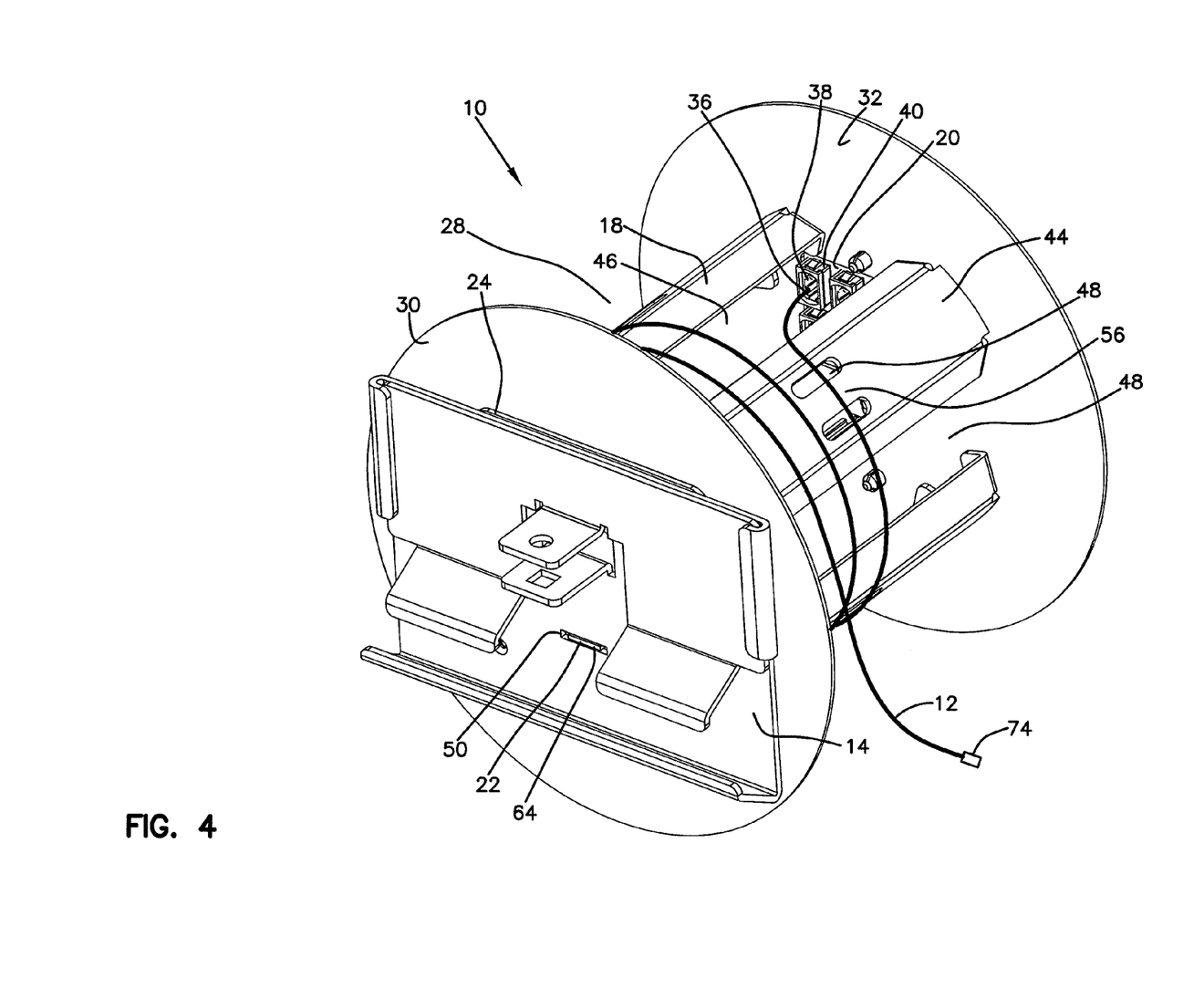
FIG. 4 is the perspective view of FIG. 3 but with the spool shown in the locked configuration of FIG. 2.
Figures 5, 6:
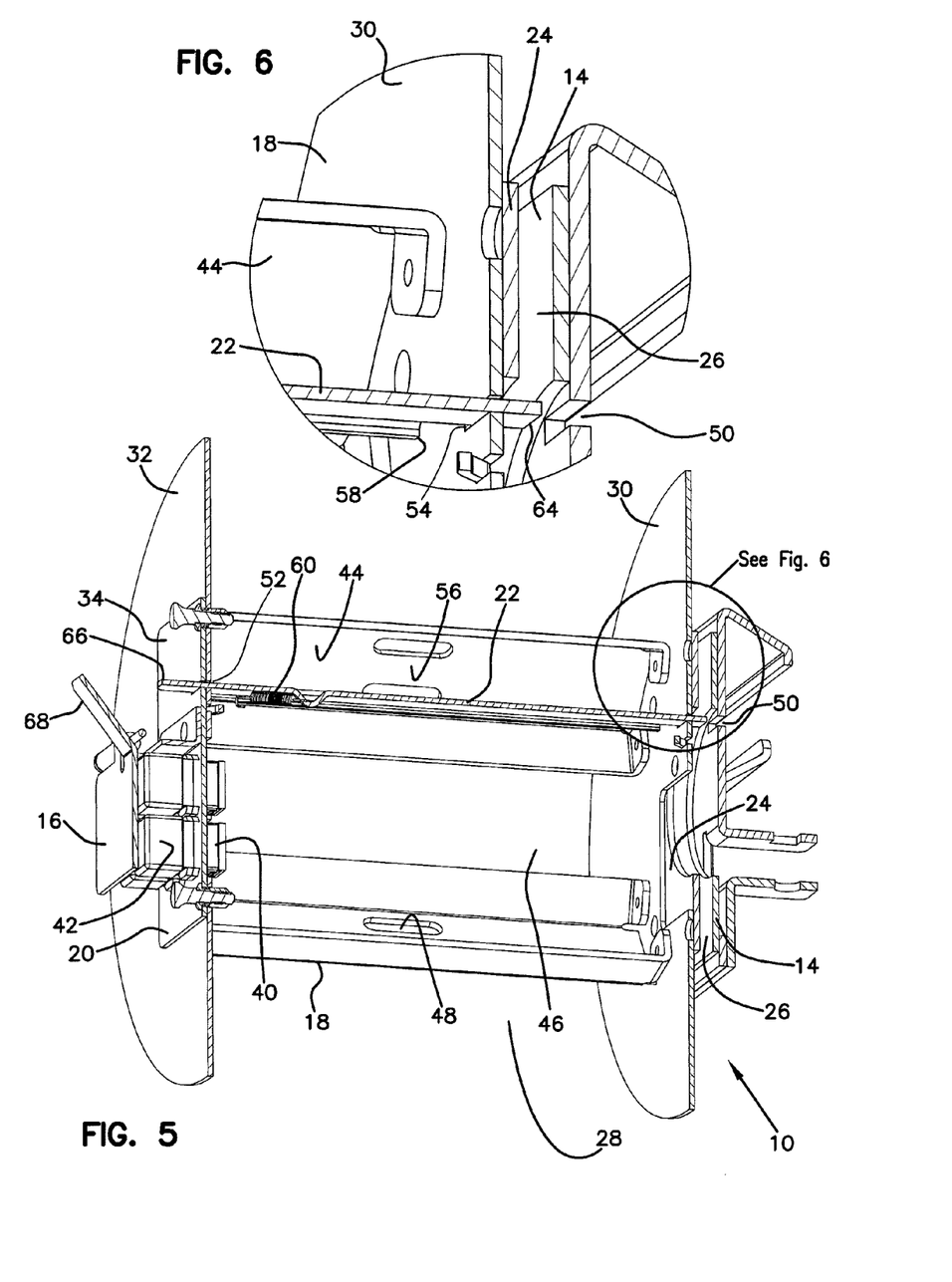
FIG. 5 is a cross-sectional perspective view of the spool of FIG. 1 shown in the unlocked configuration of FIG. 1.
FIG. 6 is an enlarged portion of FIG. 5.
Figure 7:
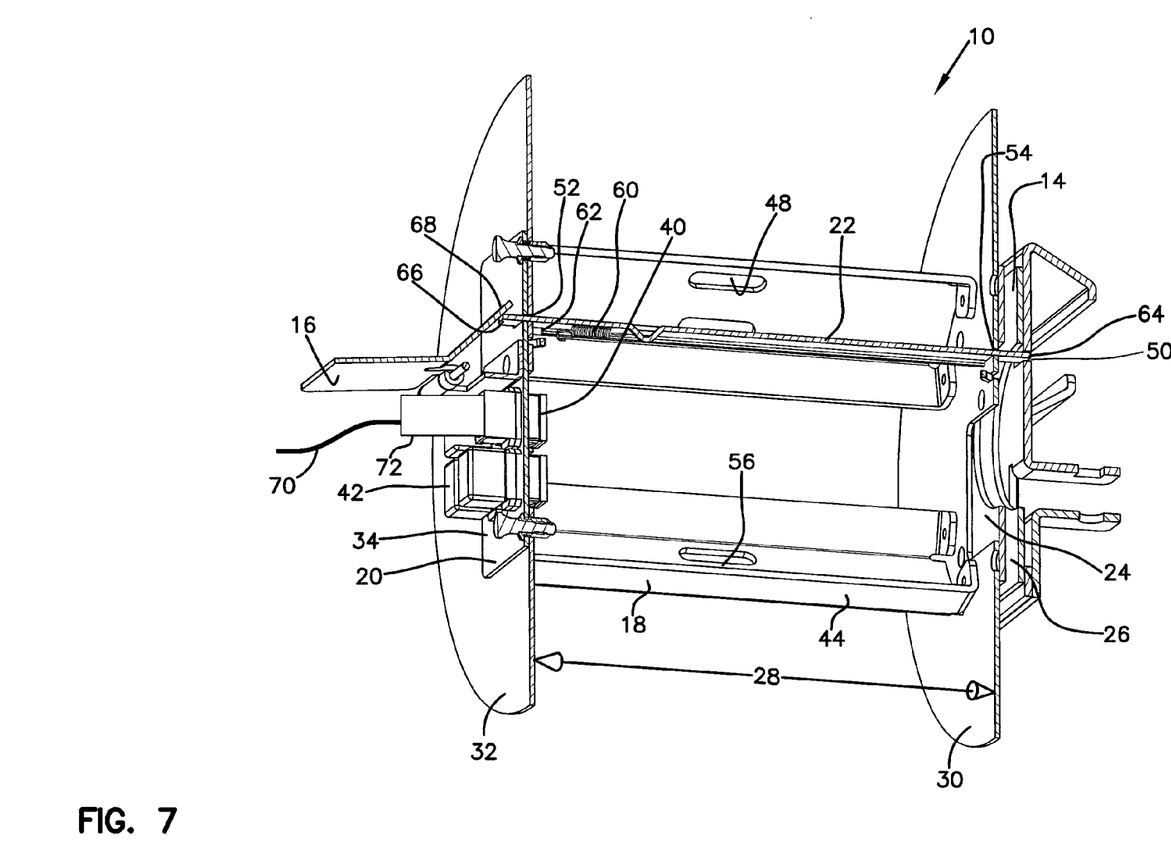
FIG. 7 is the cross-sectional perspective view of FIG. 5 but with the spool shown in the locked configuration of FIG. 2.

The hub locking member 22 is operably connected to the barrier member 16 such that the hub 18 and the base 14 are not locked by the hub locking member 22 when the barrier member 16 is at the first position (see FIGS. 1, 3, 5 and 6), and the hub 18 and the base 14 are locked together by the hub locking member 22 when the barrier member 16 is at the second position (see FIGS. 2, 4, and 7).

As depicted, the hub 18 of the spool 10 includes cross members 44 that extend between the first and the second flanges 30, 32. The set of the cross members 44 define a hollow center 46 that is radially surrounded by the cable wrapping area 28. The cross members 44 define a passage 48 between the hollow center 46 and the sable wrapping area 28. The passage 48 can be defined between two of the cross members 44. The passage 48 can be defined within the cross member 44. The cross members 44 define a wire tie attachment 56. The wire tie attachment 56 can be used with a wire tie to hold a portion of the telecommunications cable 12. The connector bulkhead 20 and the fiber optic adapter 40 receive the terminated end 36 of the telecommunications cable 12 via the hollow center 46 and the passage 48.

As depicted, the first flange 30 includes a first opening 54, the second flange 32 includes a second opening 52, and the base 14 includes a third opening 50. The second opening 52 can extend through the connector bulkhead 20. The first and the second openings 54, 52 of the flanges 30, 32 slidingly support the hub locking member 22. The hub 18 and the base 14 are locked together by the hub locking member 22 when the hub locking member 22 is slid into the third opening 54 of the base 14 (see FIGS. 4 and 7). The hub locking member 22 can include ears 58, 62 (see FIGS. 6 and 7) that prevent the hub locking member 22 from sliding out of the first and the second openings 54, 52 of the flanges 30, 32. The ears 58, 62 also function as stops and thus limit travel of the hub locking member 22 to a predetermined range. A spring 60 biases the hub locking member 22 away from the third opening 50 of the base 14 (see FIGS. 5 and 7). The ears 62 can be biased against the second flange 32 of the hub 18 by the spring 60. As depicted, the spring 60 is a tension spring.

As depicted, the hub locking member 22 includes a first end 64 and a second end 66. The barrier member 16 includes a finger 68 that engages the second end 66 of the hub locking member 22 when the barrier member 16 is at its second position (see FIGS. 2, 4, and 7). The barrier member 16 thereby overcomes the spring 60 and slides the hub locking member 22 so that the first end 64 engages the third opening 50 of the base 14. The barrier member 16 thereby locks the hub 18 and the base 14 together and prevents the hub 18 from rotating when the barrier member 16 is at the second position (see FIGS. 2, 4, and 7). Since the barrier member 16 is at the second position when a second telecommunications cable 70 is attached to the terminated end 36 of the telecommunications cable 12 (see FIG. 2), the hub 18 of the spool 10 cannot rotate when the second telecommunications cable 70 is attached. The second telecommunications cable 70 is thereby protected from being twisted by the hub 18 as the hub 18 cannot rotate when the second telecommunications cable 70 is connected to it. In the depicted embodiment, the second telecommunications cable 70 is terminated by a fiber optic connector 72. The fiber optic connector 72 is connected with the fiber optic adapter 40 opposite the fiber optic connector 38 of the telecommunications cable 12 (if connected).

To rotate the hub 18 of the spool 10 (e.g., to deploy or retract the telecommunications cable 12), the second telecommunications cable 70 must be disconnected from the connector bulkhead 20 (e.g., disconnected from the fiber optic adapter 40). Upon disconnecting the second telecommunications cable 70, the barrier member 16 is free to return to its first position and the spring 60 moves the hub locking member 22 out of engagement with the third opening 50 of the base 14. The hub 18 of the spool 10 is thereby free to rotate when the second telecommunications cable 70 is disconnected.

The principles of the present disclosure also include a method of wrapping the first telecommunications cable 12 about the hub 18 of the spool 10. The method includes: disconnecting the second telecommunications cable 70 from the first telecommunications cable 12 at a connection location at a side of the spool (if the cable 70 is connected) and thereby releasing a lock between the hub 18 of the spool 10 and the base 14 of the spool 10, wrapping a desired amount of the first telecommunications cable 12 about the hub 18 of the spool 10 by rotating the hub 18 of the spool 10, moving the barrier member 16 away from the connection location at the side of the spool 10 and thereby engaging the lock between the hub 18 of the spool 10 and the base 14 of the spool 10, and connecting the second telecommunications cable 70 to the first telecommunications cable 12 at the connection location at the side of the spool 10 and thereby preventing the releasing of the lock between the hub 18 of the spool 10 and the base 14 of the spool 10. The wrapping method can include the disconnecting of the second telecommunications cable 70 from the side of the spool 10 resulting in the barrier member 16 moving and thereby obstructing access to the terminated end 36 of the first telecommunications cable 12, and the moving of the barrier member 16 also causing the release of the lock between the hub 18 of the spool 10 and the base 14 of the spool 10. The connection location can include the fiber optic adapter 40 and the connector bulkhead 20 as described above.

The principles of the present disclosure also include a method of unwrapping the first telecommunications cable 12 about the hub 18 of the spool 10. The method includes: disconnecting the second telecommunications cable 70 from the first telecommunications cable 12 at a connection location at a side of the spool (if the cable 70 is connected) and thereby releasing a lock between the hub 18 of the spool 10 and the base 14 of the spool 10, unwrapping a desired amount of the first telecommunications cable 12 about the hub 18 of the spool 10 by rotating the huh 18 of the spool 10, moving the barrier member 16 away from the connection location at the side of the spool 10 and thereby engaging the lock between the hub 18 of the spool 10 and the base 14 of the spool 10, and connecting the second telecommunications cable 70 to the first telecommunications cable 12 at the connection location at the side of the spool 10 and thereby preventing the releasing of the lock between the hub 18 of the spool 10 and the base 14 of the spool 10. The unwrapping method can include the disconnecting of the second telecommunications cable 70 from the side of the spool 10 resulting in the barrier member 16 moving and thereby obstructing access to the terminated end 36 of the first telecommunications cable 12, and the moving of the barrier member 16 also causing the release of the lock between the hub 18 of the spool 10 and the base 14 of the spool 10. The connection location can include the fiber optic adapter 40 and the connector bulkhead 20 as described above.

Certain hubs of certain spools and cable wrapping areas of certain spools can be of various shapes and sizes (e.g., hexagonal, square, rectangular, circular, etc.). The spool 10 can be powered by the pulling of the telecommunications cable 12, a spring, a hand crank, a motor, and various other means.

The telecommunications cable 12 can be a fiber optic cable, an electrical cable, or other cables such as a hybrid fiber optic/electrical cable. In the depicted embodiment, the telecommunications cable 12 is a multi-fiber fiber optic telecommunications cable and the connector 38 is a multi-fiber fiber optic connector. In other embodiments, the telecommunications cable 12 can be a single-fiber fiber optic telecommunications cable and the connector 38 can be a single-fiber fiber optic connector. The connector 38 terminates the telecommunications cable 12 and can be connected with the adapter 40.

From the forgoing detailed description, it will be evident that modifications and variations can be made without departing from the spirit and scope of the disclosure.

What is claimed is:

1. A spool for a telecommunications cable, the spool comprising:
a base including a spool mount;

a hub including a cable wrapping area, the cable wrapping area extending between a first flange and an opposite second flange, the first flange of the hub rotatably mounted to the spool mount of the base;

a connector bulkhead adapted to receive a terminated end of the telecommunications cable, the connector bulkhead attached to the second flange of the hub;

a barrier member moveably attached to the second flange of the hub, the barrier member having a first position obstructing access to the terminated end of the telecommunications cable and a second position allowing access to the terminated end of the telecommunications cable;

a hub locking member operably connected to the barrier member such that the hub and the base are not locked by the hub locking member when the barrier member is at the first position and the hub and the base are locked together by the hub locking member when the barrier member is at the second position.

2. The spool of claim 1, wherein the spool mount of the base includes a bearing.

3. The spool of claim 1, wherein the spool mount defines a rotation axis about which the first flange of the hub is rotatably mounted, the first and the second flanges are substantially planar, and the first and the second flanges are substantially perpendicular to the rotation axis.

4. The spool of claim 1, wherein the connector bulkhead is adapted to receive a fiber optic adapter.

5. The spool of claim 1, wherein the connector bulkhead includes a fiber optic adapter and the fiber optic adapter is adapted to receive a fiber optic connector of the telecommunications cable.

6. The spool of claim 1, wherein the connector bulkhead includes a plurality of fiber optic adapters and the fiber optic adapters are each adapted to receive a fiber optic connector.

7. The spool of claim 1, wherein the connector bulkhead is removably attached to the second flange of the hub.

8. The spool of claim 1, wherein the barrier member has a plate like configuration.

9. The spool of claim 1, wherein the barrier member is moveably attached to the second flange of the hub via the connector bulkhead.

10. The spool of claim 1, wherein the barrier member is hingedly attached to the second flange of the hub.

11. The spool of claim 1, wherein a hollow center is radially surrounded by the cable wrapping area and the hub includes at least one passage between the hollow center and the cable wrapping area.

12. The spool of claim 11, wherein the connector bulkhead is adapted to receive the terminated end of the telecommunications cable via the hollow center.

13. The spool of claim 1, wherein the first flange includes a first opening, the second flange includes a second opening, and the base includes a third opening, wherein the first and the second openings slidingly support the hub locking member, and wherein the hub and the base are locked by the hub locking member when the hub locking member is slid into the third opening of the base.

14. The spool of claim 13, further comprising a spring that biases the hub locking member away from the third opening of the base.

15. The spool of claim 14, wherein the spring is a tension spring.

16. A method of wrapping a first telecommunications cable on a spool, the method comprising:

disconnecting a second telecommunications cable from the first telecommunications cable at a connection location at a side of the spool and thereby releasing a lock between a hub of the spool and a base of the spool;

wrapping a desired amount of the first telecommunications cable about the hub of the spool by rotating the hub of the spool;

moving a barrier member away from the connection location at the side of the spool and thereby engaging the lock between the hub of the spool and the base of the spool; and connecting the second telecommunications cable to the first telecommunications cable at the connection location at the side of the spool and thereby preventing the releasing of the lock between the hub of the spool and the base of the spool.

17. The method of claim 16, wherein the disconnecting of the second telecommunications cable from the side of the spool results in the barrier member moving and thereby obstructing access to a terminated end of the first telecommunications cable and the moving of the barrier member also causes the releasing of the lock between the hub of the spool and the base of the spool.

18. The method of claim 16, wherein the connection location includes a fiber optic adapter.

19. A method of unwrapping a first telecommunications cable on a spool, the method comprising:

unwrapping a desired amount of the first telecommunications cable about a hub of the spool by rotating the hub of the spool;

moving a barrier member away from a connection location at a side of the spool and thereby engaging a lock between the hub of the spool and a base of the spool; and connecting a second telecommunications cable to the first telecommunications cable at the connection location at the side of the spool and thereby preventing the releasing of the lock between the hub of the spool and the base of the spool.

20. The method of claim 19, wherein the connection location includes a fiber optic adapter.

* * * * *

UNITED STATES PATENT AND TRADEMARK OFFICE
CERTIFICATE OF CORRECTION

| | | |
|---|---|---|
| PATENT NO. | : 8,238,707 B2 | Page 1 of 1 |
| APPLICATION NO. | : 12/512620 | |
| DATED | : August 7, 2012 | |
| INVENTOR(S) | : Smrha et al. | |

It is certified that error appears in the above-identified patent and that said Letters Patent is hereby corrected as shown below:

In the Specification

Col. 2, line 65: "the sable wrapping area 28." should read --the cable wrapping area 28.--

Signed and Sealed this
Fifteenth Day of October, 2013

Teresa Stanek Rea
*Deputy Director of the United States Patent and Trademark Office*